July 17, 1928.
I. G. BRENNEMAN
1,677,266
NUT LOCK
Filed Feb. 1, 1927
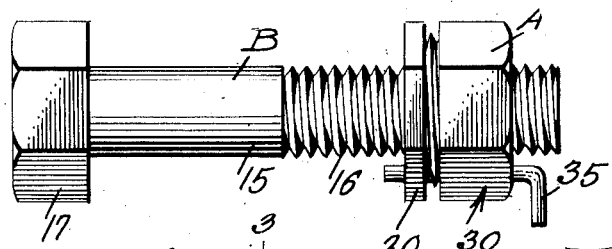
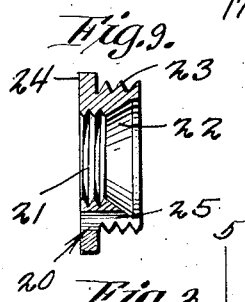
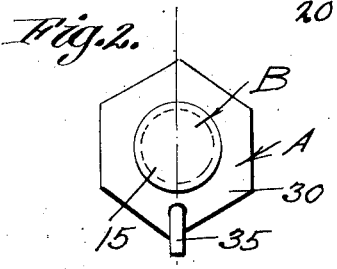
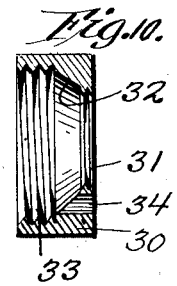
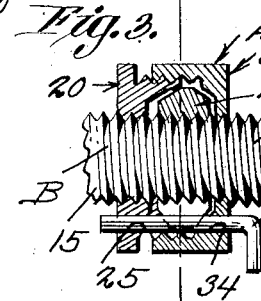
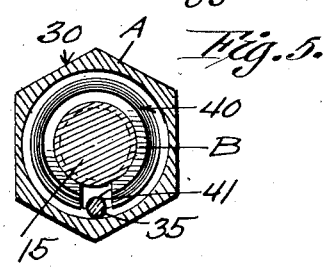
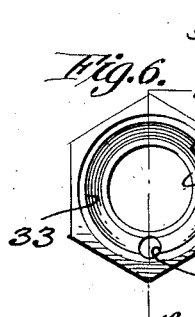
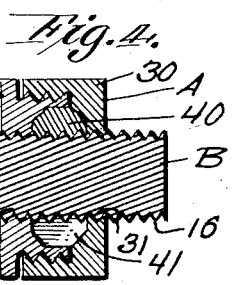
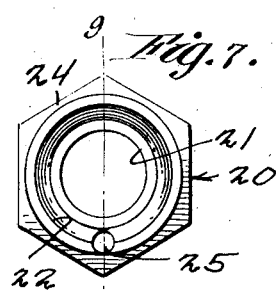
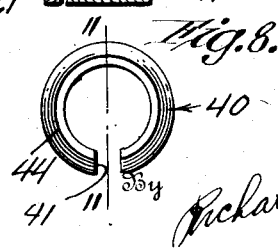
WITNESSES
Inventor
IVO GEORGE BRENNEMAN
By Richard B. Owen
Attorney Patented July 17, 1928.

1,677,266

UNITED STATES PATENT OFFICE.

IVO GEORGE BRENNEMAN, OF BLUE BALL, PENNSYLVANIA.

NUT LOCK.

Application filed February 1, 1927. Serial No. 165,223.

This invention relates broadly to means for preventing retrograde movement of a nut upon a bolt after the nut has been adjusted to its final position whereby loss of the nut through vibration and the like and the difficulties contingent therewith is prevented.

One of the primary objects of the present invention is to provide a nut lock embodying a pair of companion sections formed to provide a chamber therebetween for a split clamping ring, the sections being adjustable toward one another to permit contracting of the ring about the bolt after the nut has been finally adjusted.

Another salient object of the invention is to provide such a nut lock which can be applied to the bolt as a staple unit thereby permitting the convenient and expeditious placing of the nut in position.

A further object of the invention is to provide a nut lock embodying a pair of companion sections, one of which is adjustable on the other, the sections having and forming a compartment therebetween for the reception of a split clamping ring having its opposite faces beveled to provide a double cone, each of the nut sections having beveled faces for engaging the double cone, whereby upon adjusting of one section relative to the other, the double cone will be uniformly contracted so as to insure the proper gripping thereof on the bolt.

A further object of the invention is the provision of a nut lock including a pair of companion nut sections and a clamping ring carried thereby, with a removable key for holding all of the sections against movement relative to one another whereby the entire nut can be threaded against the work as a single unit, the key being removable to allow the adjustment of one of the nut sections to permit contraction of the ring.

A still further object of the invention is to provide a novel nut lock of the above character, which will be durable and efficient in use, one that will be simple and easy to manufacture and one which can be placed upon the market and used with conventional bolts, at a small cost.

With these and other objects in view, the invention consists in the novel construction, arrangement and formation of parts, as will be hereinafter more fully described, claimed, and illustrated in the accompanying drawings, in which drawings:

Figure 1 is a side elevation of a bolt showing my improved nut being threaded thereon, Figure 2 is an end elevation showing the improved nut being threaded on the bolt, Figure 3 is a fragmentary longitudinal section taken on the line 3—3 of Figure 2, Figure 4 is a similar section showing the nut after the same has been adjusted against the work and the adjustable nut section tightened for contracting the ring about the bolt, Figure 5 is a section taken on the line 5—5 of Figure 3, Figure 6 is a plan view of the inner nut section, Figure 7 is a bottom plan view of the outer nut section, Figure 8 is a plan view of the clamping ring, Figure 9 is a transverse section through the inner nut section, Figure 10 is a transverse section through the outer nut section, and Figure 11 is a section through the clamping ring taken on the line 11—11 of Figure 8.

Referring to the drawing in detail, wherein similar reference characters designate corresponding parts throughout the several views, the letter A generally indicates the improved nut lock and B the bolt upon which the same can be threaded.

The bolt B can be of any conventional type and includes the usual shank 15 having a portion thereof provided with threads 16 and a head 17.

The improved nut A comprises an inner nut section 20, an outer nut section 30 and a split clamping ring 40.

The inner nut section 20 is provided with a threaded bore 21 for fitting upon the thread adjacent to its inner end is enlarged and flared to provide a beveled or cone face 22. The inner end of the nut is preferably reduced and provided with external threads 23 for receiving the outer nut section as will be later described. It is to be noted that the nut section 20 inward of the reduced portion is of a polygonal shape as at 24 so that the same can be conveniently turned by a wrench.

A longitudinally extending keyway 25 is formed in the nut section and this keyway extends parallel with and at one side of the bore 21.

The outer nut section 30 has its outer surface of a polygonal shape so that the same can be readily turned by a suitable wrench and is provided with a threaded bore 31 to permit the same to be threaded upon the bolt. This bore gradually flares outward to provide a beveled or cone face 32 which is left smooth for a purpose which will also be later described. This flared face 32 terminates in a large bore 33 which is provided with internal threads for matching the threads 23 on the inner nut section 20 whereby the outer nut section is threaded thereon. When the nut sections are threaded together a chamber is formed for the ring 40 which will now be described.

The clamping ring 40 is provided with a transverse slit 41 at one side and is provided with internal threads 42 so that the same can be threaded directly upon the bolt. The opposite corner edges of the ring are beveled as at 43 and 44 which in effect forms cone faces against which are adapted to act the faces 22 and 32 of the nut sections 20 and 30. The nut section 30 is provided with a keyway 34 at one side of the bore 31 as clearly shown in the drawings.

In use of the improved nut lock the ring 40 is placed within the nut section 20 after which the nut section 30 is threaded on the nut section 20 and when the keyways 25 and 34 come into alinement a locking key 35 is inserted through the same and the slit portion 41 of the ring. This locks all the parts of the nut together and the nut can now be threaded upon the bolt as a single unit and firmly tightened against the work. After the nut has been tightened on the bolt in contact with the work, the key is removed and the section 30 is rotated relative to the section 20 which brings the faces 32 and 22 of the nut sections into contact with the faces 43 and 44 of the clamping ring. This contracts the ring about the bolt and firmly locks the nut in place against retrograde movement.

When it is desired to remove the nut it is merely necessary to rotate the section 30 in a reverse direction for releasing the ring 40 and the key 35 can then be inserted in the keyways 34 and 35 and through the split 41, so that the entire nut can be rotated as a unit.

From the foregoing description, it can be seen that I have provided an exceptionally simple nut lock which can be locked upon the bolt in an expeditious manner and readily removed therefrom when desired.

Changes in details may be made without departing from the spirit or the scope of this invention, but what I claim as new is:

1. A nut lock comprising an inner nut section, an outer nut section, one of the nut sections being threaded upon the other, the bores of the nut sections being enlarged at their inner ends to provide a chamber when the nut sections are fitted together, a split clamping ring disposed in the chamber having internal threads for engaging the bolt, the nut sections and the clamping ring having coacting beveled faces for bringing about the contraction of the ring when one section is threaded upon the other, each of the nut sections having keyways at one side of the bore thereof adapted to be brought into registration with one another at the split portion of the ring, a removable key fitted in said alined keyways and said split for holding the nut sections and ring against relative movement to one another whereby the nuts can be threaded upon a bolt as a single unit.

2. In a nut lock, the combination with a bolt, of a nut including a pair of companion sections adapted to be threaded upon the bolt, the nut sections being adjustable relative to one another and having their bores enlarged to provide an internal chamber, a split locking ring fitted in the chamber provided with opposite cone faces, the nut sections having inclined faces for engaging the ring for contracting the same in locking engagement about the bolt, and means for holding the nut sections and the ring against relative movement during the initial application of the nut upon the bolt.

3. In a nut lock, the combination with a bolt, of a nut including a pair of companion nut sections adapted to be threaded upon the bolt adjustable relative one to the other, a clamping ring confined between the nut sections adapted to be contracted on the bolt by adjustment of said nut section relative to one another, and means for holding the nut sections against relative movement during the initial application of the nut upon the bolt.

In testimony whereof I affix my signature.

IVO GEORGE BRENNEMAN.